United States Patent [19]

Chyung

[11] 4,018,612

[45] Apr. 19, 1977

[54] TRANSPARENT BETA-QUARTZ GLASS-CERAMICS

[75] Inventor: Kenneth Chyung, Elmira, N.Y.

[73] Assignee: Corning Glass Works, Corning, N.Y.

[22] Filed: Mar. 25, 1976

[21] Appl. No.: 670,529

[52] U.S. Cl. .............................. 106/39.7; 156/39.8
[51] Int. Cl.$^2$ ...................... C03C 3/22; C03C 3/04
[58] Field of Search ......................... 106/39.7, 39.8

[56] References Cited

UNITED STATES PATENTS

| | | | |
|---|---|---|---|
| 3,113,009 | 12/1963 | Brown et al. ...................... | 106/39.7 |
| 3,252,811 | 5/1966 | Beall ................................. | 106/39.7 |
| 3,625,718 | 12/1971 | Petticron ........................... | 106/39.7 |
| 3,677,785 | 7/1972 | Horikawa et al. ................. | 106/39.7 |
| 3,775,154 | 11/1973 | Grego et al. ...................... | 106/39.7 |
| 3,928,229 | 12/1975 | Neuroth ............................ | 106/39.7 |

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

This invention is concerned with the production of highly-crystalline, transparent glass-ceramic articles, wherein the predominant crystal phase is a beta-quartz solid solution, and which exhibit transmittances of infra-red radiations in excess of 75%, and, frequently in excess of 85%, at a wave length of 2.5 microns in articles having cross sections of about 3 mm. The articles also demonstrate excellent resistance to attack by acids and detergents, and possess coefficients of thermal expansion over the range of room temperature (R.T.) to 600° C. of less than $10 \times 10^{-7}/°$ C. Compositions operable in the invention are encompassed within a very narrow range of the $Li_2O$—$MgO$—$ZnO$—$Al_2O_3$—$SiO_2$ quinary nucleated with a combination of $TiO_2 + ZrO_2$. Where desired, coloring agents conventional in the glass art can be added to yield colored, transparent, glass-ceramic articles.

1 Claim, No Drawings

TRANSPARENT BETA-QUARTZ GLASS-CERAMICS

BACKGROUND OF THE INVENTION

Glass-ceramic technology is founded in U.S. Pat. No. 2,920,971. That patent teaches the three general steps required in the manufacture of conventional glass-ceramic articles. Hence, a glass-forming batch, usually containing a nucleating agent, is first melted. The resulting melt is then simultaneously cooled to a substantially crystal-free glass and an article of a desired geometry shaped therefrom. Finally, the glass article is subjected to an explicitly-described heat treatment which causes the glass to crystallize in situ. As is also explained in that patent, the heat treatment promoting crystallization in situ is customarily conducted in two stages. First, the glass article is heated to a temperature somewhat above the transformation range of the glass to initiate the development of submicroscopic nuclei therein. Second, the nucleated glass is heated to a higher temperature, commonly above the softening point of the glass, to promote the growth of crystals on the nuclei.

Inasmuch as a glass-ceramic article is the result of the essentially simultaneous growth of crystals on countless nuclei dispersed throughout the parent glass body, the microstructure thereof comprises fine-grained crystals of relatively uniform size, homogeneously dispersed and randomly oriented within a residual glassy matrix. Glass-ceramic articles are normally very highly crystalline, i.e., considerably greater than 50% by volume crystalline. Because of that fact, the physical properties of such articles will be more closely akin to those exhibited by the crystal phase, rather than to those of the residual glassy matrix. Further, the residual glass will customarily have a very different composition from that of the parent glass since the constituents making up the crystal phase will have been removed therefrom.

For more information regarding the theoretical and practical considerations involved in the production of glass-ceramic articles, as well as for further discussion of the microstructure attendant in such articles, reference is hereby made to U.S. Pat. No. 2,920,971.

The widest use of glass-ceramic materials has been in the field of culinary ware. Cooking utensils have been marketed under the trademark CORNING WARE and flat sheeting for cooking surfaces on the top of stoves has been marketed under the trademark THE COUNTER THAT COOKS. Both types of products have been manufactured by Corning Glass Works, Corning N.Y.

It has been appreciated that compositions demonstrating good transmission of infra-red radiation would be very useful for culinary ware. Hence, the heat from the stove burner source would pass more quickly through the cross section of the ware and, thereby, expedite cooking. Also in the field of culinary ware, with particular emphasis on cooking vessels, market surveys have strongly indicated a consumer desire for transparent materials.

For use as culinary ware, a glass-ceramic material must be mechanically strong, have a low coefficient of thermal expansion, exhibit good chemical durability, and must be highly resistant to detergent attack and food staining. Furthermore, the parent glass must demonstrate the physical properties necessarily required for large scale melting and forming techniques. In sum, the final commercial product must not only display chemical and physical properties desirable in culinary applications, but must also be capable in the glass state of conforming to high speed production practices. It is with respect to these glass working characteristics that many of the proposed compositions for culinary ware have fallen short. Numerous problems have arisen such as, for example, very high melting temperatures have been required; the glass has been prone to devitrification; the glass viscosity has been such as to render it difficult to form and work; and firepolishing of the glass articles has been difficult at best.

The previously-marketed glass-ceramic materials for culinary use, such as the CORNING WARE and THE COUNTER THAT COOKS products noted above, have been opaque to visible radiation and very poorly transmitting to infra-red radiation. U.S. application Ser. No. 603,544, filed Aug. 11, 1975 by H. L. Rittler, discloses glass-ceramic articles which are opaque to visible light, but demonstrate relatively good transmittance to infra-red radiation. Thus, such articles will transmit up to about 60% of radiations having a wave length of 3.5 microns through a wall thickness of 4.25 mm. The compositions of those articles lie within a very narrowly-defined area of the $Li_2O$—$ZnO$—$Al_2O_3$—$SiO_2$ quaternary, nucleated with $TiO_2$, wherein beta-spodumene solid solution comprises the predominant crystal phase.

U.S. application Ser. No. 649,475, filed Jan. 15, 1976 by H. L. Rittler, describes the production of glass-ceramic articles which are transparent to visible radiation and highly transmitting in the infra-red portion of the spectrum. Thus, at thickness of 4 mm, such articles can transmit up to 80% of radiations having a wave length of 3.5 microns. The compositions disclosed therein are encompassed within an extremely narrow range of the $Li_2O$—$Al_2O_3$—$SiO_2$—$P_2O_5$ quaternary, nucleated with a combination of $TiO_2$ and $ZrO_2$, wherein beta-quartz solid solution constitutes the predominant crystal phase. The presence of $P_2O_5$ results in the replacement of some of the $SiO_2$ in the beta-quartz structure with $AlPO_4$.

Transparent glass-ceramic articles containing beta-quartz solid solution have been known to the prior art. Beta-quartz, the hexagonal trapezohedral modification of $SiO_2$, exhibits very low birefringence, i.e., optical anisotropy, and a slightly negative coefficient of thermal expansion. This combination of properties has resulted in considerable research to develop practically commercial products from such bodies. The basis of the beta-quartz solid solution (also frequently termed beta-eucryptite solid solution) is believed to be the substitution of $Al^{+3}$ ions for some of the $Si^{+4}$ ions in the quartz structure, with the attendant charge deficiency being made up with the introduction of a small ion such as $Li^+$, $Mg^{+2}$, or $Zn^{+2}$ into the quartz structure.

DISCUSSION OF PRIOR ART

U.S. Pat. No. 3,157,522 first disclosed the manufacture of transparent glass-ceramic articles wherein beta-eucryptite solid solution comprised the primary crystal phase. That patent described compositions within the $Li_2O$—$Al_2O_3$—$SiO_2$—$TiO_2$ quaternary as being operable. However, those compositions were difficult to melt and the resulting glasses were quite unstable. This resulted in adding various modifying components thereto which would ameliorate those problems while not deleteriously affecting the physical characteristics of the crystalline product to any considerable extent. For example, the inclusion of such conventional fluxing agents as $Na_2O$, $K_2O$, and $B_2O_3$ can significantly raise the coefficient of thermal expansion and/or impair the chemical durability and/or decrease the high temperature capability of the final product. Attempts to avoid those undesirable effects have involved such additions as the alkaline earth metal oxides (vide Examples 10–14 of Table II). The addition thereof will, indeed, improve the melting and forming behavior of the parent glass, but also will customarily have the concomitant adverse side effect of severely reducing the infrared transmittance of the resultant glass-ceramic.

U.S. Pat. No. 3,252,811 describes the production of transparent glass-ceramic articles utilizing parent glasses in the $XO—Al_2O_3—SiO_2$ composition system, nucleated with $ZrO_2$, wherein beta-quartz solid solution comprised the predominant crystal phase. The XO component consisted of $Li_2O + ZnO$ and/or MgO. Such glasses employed melting temperatures of about 1600°–1800° C., which are generally higher than conventional glass melting practice.

U.S. Pat. No. 3,241,985 discloses the formation of transparent glass-ceramic articles from base compositions in the $Li_2O—Al_2O_3—SiO_2$ field nucleated with $ZrO_2$. Minor amounts of the alkali metals, the alkaline earth metals, and/or $TiO_2$ can be added.

U.S. Pat. No. 3,282,712 discusses the manufacture of transparent glass-ceramic articles containing beta-eucryptite as the predominant crystal phase from compositions in the $Li_2O—Al_2O_3—SiO_2$13 $P_2O_5$ system nucleated with $ZrO_2 + TiO_2$. The $P_2O_5$ was included to aid in dissolving the $ZrO_2$ in the glass melt and to inhibit scum formation thereon. The addition of alkaline earth metal oxides is encouraged to improve the working characteristics of the parent glass.

U.S. Pat. No. 3,484,327 describes the preparation of transparent glass-ceramic articles from parent glasses in the $Li_2O—Al_2O_3—SiO_2$ field, nucleated with $TiO_2 + ZrO_2$, wherein beta-eucryptite constitutes the principal crystal phase. Numerous additions to the base composition are proposed including the alkali metals, the alkaline earth metals, and $B_2O_3$. The two exemplary compositions provided contained $CaO + Na_2O$.

U.S. Pat. No. 3,499,773 discloses the production of transparent glass-ceramic articles from compositions in the $Li_2O—Al_2O_3—SiO_2$ system, nucleated with $TiO_2$ and/or $ZrO_2$ and/or $SnO_2$, wherein beta-eucryptite comprises the primary crystal phase. Additions of alkali metals, alkaline earth metals, and $P_2O_5$ are suggested and the sole exemplary composition contained $Na_2O$, MgO, and $P_2O_5$.

U.S. Pat. No. 3,677,785 is directed to the preparation of transparent glas-ceramic articles employing compositions in the $Li_2O—BaO—MgO—Al_2O_3—SiO_2$ field nucleated with $TiO_2 + ZrO_2$. The inclusion of MgO + BaO is stated to be critical in promoting the solution of $ZrO_2$ into the molten glass. Additions of alkali metals and $B_2O_3$ are suggested as fluxes.

U.S. Pat. No. 3,788,865 discusses the formation of transparent glass-ceramic articles containing beta-eucryptite crystals as the predominant crystal phase from compositions in the $Li_2O—Al_2O_3—SiO_2$ field nucleated with $TiO_2$ and/or $ZrO_2$ and/or $SnO_2$. Additions of alkaline earths, $P_2O_5$, and $B_2O_3$ are encouraged. The use of conventional coloring agents is noted.

OBJECTIVES OF THE INVENTION

The principal objective of the instant invention is to produce transparent glass-ceramic articles exhibiting good mechanical strength, excellent chemical durability and resistance to detergent attack and food staining, a coefficient of thermal expansion over the range of room temperature (R.T.) to 600° C. of less than about $10 \times 10^{-7}/°$ C., and which will display a transmittance in excess of 75%, and, commonly, in excess of 85%, of infra-red radiations having a wave length of 2.5 microns in samples of 3 mm. crosss section.

A further critical objective of the instant invention is to provide such articles which can be produced from parent glass compositions that can be melted and formed employing conventional, large scale production practices.

SUMMARY OF THE INVENTION

I have found that those objectives can be achieved utilizing parent glass compositions consisting essentially, in weight percent on the oxide basis, of 2.5—3.5% $Li_2O$, 1.5–2.5% MgO, 1–2% ZnO, 17.75–20% $Al_2O_3$, 67–70% $SiO_2$, 2–4.5% $TiO_2$, and 1–2% $ZrO_2$. The inclusion of up to 2% BaO can improve the melting qualities of the original glass and does not appear to adversely affect transparency in the final product. The most advantageous glass melting and forming characteristics, as well as the most desirable chemical and physical properties in the final crystallized article, will be obtained where the base composition consists solely of the required constituents with, optionally, the inclusion of BaO (exclusive of conventional fining and coloring agents where added). In particular, additional alkali metal oxides, additional alkaline earth metal oxides other than BaO, and $B_2O_3$ will preferably be essentially absent, I.e., present in impurity amounts only if present at all.

The parent glass bodies can be crystallized in situ to fine-grained, highly crystalline glass-ceramic articles, wherein beta-quartz solid solution comprises the predominant crystal phase, via heat treatment at temperatures between about 850°–950° C.

Conventional glass coloring agents such as $Co_3O_4$, NiO, $Cr_2O_3$, $Fe_2O_3$, $MnO_2$, $V_2O_5$, and $Cu_2O$, as well as most transition metal oxides, can be included in the base glass composition to impart various shades of coloring while maintaining transparency in the body.

DESCRIPTION OF PREFERRED EMBODIMENTS

Table I records a group of exemplary compositions, expressed in terms of parts by weight on the oxide basis, which can be operable in the instant invention. Inasmuch as the sum of the individual components totals 100 or closely approximates 100, the constituents can properly be deemed to be reported in terms of weight percent. The actual ingredients making up the starting batch may comprise any materials, either the oxides or other compounds, which, when melted together, will be converted into the desired oxide in the proper proportions. The batch materials will be compounded and ballmilled together to aid in securing a homogeneous melt. The mixtures will then be placed into a platinum crucible the crucible covered with a lid and positioned within a gas-fired furnace operating at about 1600° C. The batch is melted within the crucible for about 16 hours with stirring, then poured into a steel mold to produce a rectangular slab about 6 × 6 ×

½ inch which will be immediately transferred to an annealer operating at about 650° C. Samples of the necessary size and configuration for various testing purposes will be cut from the annealed slabs.

In the recited examples $As_2O_5$ performs its conventional role of a fining agent.

tion range, because the rate of crystal growth will be more rapid when the glass is highly nucleated.

Therefore, in the preferred practice of the invention, a nucleation step utilizing a treatment time of about 1–6 hours within the temperature range of about 750°–850° C. will be followed by a crystallization step

TABLE I

|  | 1 | 2 | 3 | 4 | 5 | 6 | 7 | 8 | 9 |
|---|---|---|---|---|---|---|---|---|---|
| $SiO_2$ | 69.6 | 68.8 | 68.7 | 68.5 | 69.7 | 70.0 | 68.75 | 69.11 | 67.4 |
| $Al_2O_3$ | 18.9 | 19.6 | 18.6 | 18.6 | 17.9 | 18.1 | 18.9 | 18.74 | 19.4 |
| $Li_2O$ | 2.8 | 3.0 | 3.0 | 3.0 | 3.0 | 3.0 | 2.8 | 2.97 | 2.8 |
| MgO | 2.2 | 2.2 | 2.1 | 2.2 | 2.2 | 2.2 | 2.2 | 2.18 | 2.2 |
| ZnO | 1.2 | 1.2 | 1.2 | 1.2 | 1.2 | 1.2 | 1.2 | 1.19 | 1.2 |
| $TiO_2$ | 3.0 | 3.0 | 3.9 | 3.9 | 4.3 | 4.0 | 2.8 | 2.97 | 2.8 |
| $ZrO_2$ | 1.5 | 1.5 | 2.0 | 2.0 | 1.0 | 1.0 | 1.5 | 1.49 | 1.5 |
| $As_2O_3$ | 0.8 | 0.7 | 0.5 | 0.6 | 0.6 | 0.5 | 0.7 | 0.79 | 0.7 |
| $Co_3O_4$ | 0.004 | 0.005 | 0.005 | 0.005 | 0.001 | 0.006 | — | 0.005 | 0.002 |
| $MnO_2$ | — | — | — | — | — | 0.01 | — | — | — |
| BaO | — | — | — | — | — | — | 1.0 | 0.55 | 1.85 |
| $Nd_2O_3$ | — | — | — | — | — | — | 0.15 | — | 0.25 |

The glass slabs of the exemplary compositions can be converted into the desired fine-grained, transparent glass-ceramic articles by being exposed to temperatures between about 850°–950° C. The rate of crystal growth is directly dependent upon temperature, i.e., a longer period of time will be required to complete crystallization where a temperature at the cooler end of the crystallization range is employed than at more elevated temperatures within the range. Hence, a period of 24 hours or longer may be required at the cooler extreme of the crystallization range, whereas times as brief as 0.25 hour may be adequate at the upper extreme. Temperatures much above 950° C. ought to be avoided since such hazard the conversion of the beta-quartz solid solution crystals to beta-spodumene solid solution crystals with accompanying haze or even total capacity of the slab. Furthermore, extremely long heat treatments within the proper crystallization range can lead to excessive grain growth with the consequent development of haze in the slab.

I have discovered that improved uniformity of crystal size will customarily be attained where a two-step heat treatment is utilized in the crystallization step. Thus, the glass body will be initially heated to a temperature somewhat above the transformation range of the glass and held thereat for a sufficient period of time to assure a substantial development of nuclei. Thereafter, the nucleated glass is heated to a higher temperature, normally in the vicinity of or above the softening point thereof, to promote the growth of crystals on the nuclei.

It will be appreciated that, when the temperature of the glass body is elevated above the transformation range and, particularly, when it is raised above the softening point thereof, caution must be exercised such that the rate of heating is not so rapid that sufficient crystal growth is not provided to support the body. Stated otherwise, where the glass body is heated too rapidly, deformation and/or slumping thereof can occur. Heating rates of up to 10° C./minute may be utilized successfully where formers or other types of physical supports are employed. Nevertheless, heating rates no higher than about 5° C./minute have generally been found satisfactory where no physical supports are provided.

Utilizing an initial nucleation step can also be helpful in reducing the hazard of body deformation as the temperature of the glass is elevated to the crystallizainvolving about 1–8 hours at temperatures between about 850°–950° C.

The glass slabs of the exemplary compositions of Table I will be annealed to room temperature to allow visual inspection of glass quality and to cut samples for various physical property measurements. This latter process is considerably easier with the original glass than with the final crystalline product. However, it must be recognized that cooling of the glass bodies to room temperature is not demanded to subsequently obtain the desired highly crystalline products. Hence, the molten batch need only be cooled to a temperature at least within the transformation range of the glass to yield an essentially crystal-free glass, and thereafter the crystallization treatment of the glass commenced. The transformation range has been defined as that temperature at which a liquid melt is considered to have become an amorphous solid. Such temperature has generally been held to lie in the vicinity of the annealing point of the glass.

Table II records nucleation and crystallization heat treatments which can be applied to the glass slabs of Table I. Individual dwell periods at specific temperatures are commonly employed in the laboratory as a matter of convenience, but that practice is not necessary. The only requirement is that the glass be subjected to temperatures within the nucleation and crystallization schedules. In the tabluated treatments, the glass articles will be heated in an electrically-fired furnace at a rate of about 5° C./minute to the recited hold periods. At the conclusion of the crystallization step, the electric current to the furnace will normally simply be cut off and the glass-ceramics allowed to cool to room temperature while being retained within the furnace. It has been estimated that this rate of cooling within the furnace averages about 3°–5° C./minute. Much more rapid rates of cooling are, of course, quite feasible since the coefficients of thermal expansion of the crystallized articles are less than $10 \times 10^{-7}/°$ C. over the range of R.T. to 600° C. Cooling at this furnace rate is merely a matter of convenience.

Table II also reports a visual description of the crystallized articles and such various physical properties as coefficient of thermal expansion ($\times 10^{-7}/°$ C.) over the range of R.T. to 600° C., the percent transmittance of infra-red radiation at a wave length of 2.5 microns through a polished plate having a thickness of 3 mm., the liquidus (° C.), the viscosity of the glass at the liquidus (poises), and the modulus of rupture (psi). A viscosity of at least about 10,000 poises is required to roll sheeting and press objects.

Electron microscopy has indicated the articles to be highly crystalline, i.e., greater than 50% by volume crystalline and, normally, greater than 75%. The individual crystals are generally smaller than 3000A in diameter so as to provide transparency. X-ray diffraction analysis has identified beta-quartz solid solution as essentially the sole crystal phase present. The crystallized article may display a pale yellow or amber tint where no colorant is employed.

then withdrawn into the ambient environment. Third, the surface is washed in tap Water, dried and examined.

After two cycles of that test, the Code 9608 material exhibits a slight gray color. With the Code 9617 material, a slight gray tint is noticeable after 10 cycles. No discoloration can be observed with the materials of the instant invention even after about 20 test cylces.

Resistance to detergent attack has been studied employing the following test. A 0.3% aqueous solution of SUPER SOILAX detergent, marketed by Economics Laboratories, St. Paul, Minn. is prepared. The solution

TABLE II

| Example No. | Heat Treatment | Visual Description | Exp. Coef. | Modulus of Rupture | Infra-Red | Liquidus | Viscosity at Liquidus |
|---|---|---|---|---|---|---|---|
| 1 | 2 hours at 750° C. 1 hour at 900° C. | Light Lavender, Transparent | 6.8 | 9500 | 86 | 1260° | 40,000 |
| 2 | 2 hours at 750° C. 1 hour at 875° C. | Light Lavender, Transparent | 7.8 | 9000 | 85 | 1264° | 35,000 |
| 3 | 2 hours at 750° C. 1 hour at 900° C. | Light Lavender, Transparent | 9.6 | 10,000 | 85 | 1234° | 40,000 |
| 4 | 2 hours at 750° C. 2 hours at 875° C. | Very Light Lavender, Transparent | 9.6 | — | — | 1234° | 40,000 |
| 5 | 2 hours at 750° C. 2 hours at 880° C. | Very Light Burgundy, Transparent | 9.0 | — | — | — | — |
| 6 | 2 hours at 800° C. 2 hours at 875° C. | Very Light Lavender, Transparent | — | — | — | — | — |
| 7 | 1 hour at 760° C. 1 hour at 900° C. | Light Green, Transparent | 10.0 | 9700 | 86 | 1270° | 30,000 |
| 8 | 2 hours at 750° C. 1 hour at 900° C. | Light Lavender, Transparent | 8.0 | 9000 | 82 | — | — |
| 9 | 1 hour at 760° C. 1 hour at 875° C. | Light Gray, Transparent | 9.8 | 9200 | — | — | — |

For applications where an article will come into contact with foods, resistance to food stains and detergent attack, as well as good chemical durability are obviously prime requisites. Corning Code 9608, referred to above as CORNING WARE, and Corning Code 9617, noted above as THE COUNTER THAT COOKS, have the approximate analyses set out below in weight percent.

| | Code 9608 | Code 9617 |
|---|---|---|
| $SiO_2$ | 69.5 | 66.7 |
| $Al_2O_3$ | 17.6 | 20.5 |
| $Li_2O$ | 2.7 | 3.5 |
| MgO | 2.6 | 1.6 |
| ZnO | 1.0 | 1.2 |
| $TiO_2$ | 4.7 | 4.8 |
| $ZrO_2$ | 0.2 | 0.05 |
| $As_2O_3$ | 0.9 | 0.4 |
| F | 0.03 | 0.22 |
| $Fe_2O_3$ | 0.06 | 0.035 |
| $B_2O_3$ | 0.07 | — |
| $MnO_2$ | 0.03 | — |

Each product is a white, opaque, highly crystalline glass-ceramic body, wherein beta-spodumene solid solution comprises the predominant crystal phase, and each has been marketed commercially for use as culinary ware.

U.S. Pat. No. 3,582,371 describes a test for determining the resistance of products to food staining, wherein spinach extract is employed as the staining agent. Reference is made to that patent for a more detailed discussion of the test method. However, in brief, the test contemplates three general steps. First, a 1% by weight aqueous solution of freeze-dried spinach extract is deposited upon the glass-ceramic surface. Second, the coated sample is heated at 5° C./minute to 400° C., maintained at that temperature for 20 minutes, and is heated to 95° C. and samples of the articles to be tested immersed therein, the surface areas of the samples being limited by the ratio of 12 square inches to 1 pound of the solution. Samples are removed periodically from the hot solution, rinsed in tap water, and wiped dry. A portion of the sample surface is coated with SPOTCHECK dye penetrant, marketed by Magnaflux Corporation, Chicago, Ill., and the dye allowed to stand thereon for 20 seconds in the ambient environment. The dye is dried and the surface cleaned with a household cleanser powder for about 30 seconds.

In the case of the Code 9608 material, supra, a slight stain is observed after a 6-hour immersion in the detergent solution. With the Code 9617 material, supra, slight staining can be seen after about 16 hours. The glass-ceramics of the present invention demonstrated only the barest indication of discoloration after about 72 hours.

The following tests have been devised to define the chemical durability with respect to acids and bases. Samples for each test are carefully weighed and their surface area measured so that loss in weight in milligrams per square centimeter ($mg/cm^2$) can be calculated. In the test for acid durability, a sample is immersed into a 5% by weight aqueous solution of hydrochloric acid (HCl) heated to 95° C. for a period of 24 hours. In the test for alkaline durability, a sample is immersed into a 5% by weight aqueous solution of sodium hydroxide (NaOH) heated to 95° C. for a period of 6 hours. Weight losses of several materials are recorded below, that of the inventive products comprising an average value.

| | Code 9608 | Code 9617 | Inventive Materials |
|---|---|---|---|
| HCl | 0.12 | <0.01 | ~0.02 |

-continued

| | Code 9608 | Code 9617 | Inventive Materials |
|---|---|---|---|
| NaOH | 2.82 | 0.70 | 0.29 |

The glass-ceramic articles of the present invention unquestionably perform better in each of those three tests than the presently-marketed products.

I claim:

1. A transparent glass-ceramic article exhibiting a coefficient of thermal expansion (R.T.–600° C.) less than about $10 \times 10^{-7}/°C.$, excellent chemical durability and resistance to detergent attack, an infra-red transmittance at a wave length of 2.5 microns through a polished plate of about 3 mm. thickness of in excess of 75%, and wherein beta-quartz solid solution constitutes the predominant crystal phase, said glass-ceramic article being crystallized in situ from a parent glass having a viscosity at the liquidus of at least 10,000 poises and consisting essentially, by weight on the oxide basis, of 2.5–3.5% $Li_2O$, 1.5–2.5% MgO, 1–2% ZnO, 17.75–20% $Al_2O_3$, 67–70% $SiO_2$, 2–4.5% $TiO_2$, 0–2% BaO, and 1–2% $ZrO_2$, and wherein alkali metal oxides other than $Li_2O$, alkaline earth metal oxides other than MgO and BaO, and $B_2O_3$ are essentially absent therefrom.

* * * * *

UNITED STATES PATENT AND TRADEMARK OFFICE
CERTIFICATE OF CORRECTION

PATENT NO. : 4,018,612
DATED : April 19, 1977
INVENTOR(S) : Kenneth Chyung

It is certified that error appears in the above-identified patent and that said Letters Patent are hereby corrected as shown below:

Column 3, line 32, "$Li_2O-Al_2O_3-SiO_2 13\ P_2O_5$" should be -- $Li_2O-Al_2O_3-SiO_2-P_2O_5$ --.

Column 3, line 55, "glas-ceramic" should be -- glass-ceramic --.

Signed and Sealed this twenty-sixth Day of July 1977

[SEAL]

Attest:

RUTH C. MASON
*Attesting Officer*

C. MARSHALL DANN
*Commissioner of Patents and Trademarks*